(12) United States Patent
Birgel et al.

(10) Patent No.: US 11,945,321 B2
(45) Date of Patent: Apr. 2, 2024

(54) METHOD FOR CHARGING A HIGH-VOLTAGE BATTERY OF AN ELECTRIC DRIVE OF A VEHICLE, AND POWER TRANSMISSION SYSTEM FOR A VEHICLE

(71) Applicant: Volkswagen Aktiengesellschaft, Wolfsburg (DE)

(72) Inventors: Paul Birgel, Berlin (DE); Kai Kuhr, Berlin (DE); Marco Bröcker, Berlin (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 206 days.

(21) Appl. No.: 17/621,652

(22) PCT Filed: Jun. 23, 2020

(86) PCT No.: PCT/EP2020/067440
§ 371 (c)(1),
(2) Date: Dec. 21, 2021

(87) PCT Pub. No.: WO2020/260244
PCT Pub. Date: Dec. 30, 2020

(65) Prior Publication Data
US 2022/0355685 A1 Nov. 10, 2022

(30) Foreign Application Priority Data
Jun. 28, 2019 (DE) .......................... 102019209476.7

(51) Int. Cl.
*F02N 17/00* (2006.01)
*B60L 53/18* (2019.01)
(Continued)

(52) U.S. Cl.
CPC .............. *B60L 53/18* (2019.02); *H02J 1/082* (2020.01); *H02J 7/0013* (2013.01); *H02J 7/342* (2020.01);
(Continued)

(58) Field of Classification Search
CPC ....................................................... B60L 53/62
See application file for complete search history.

(56) References Cited

U.S. PATENT DOCUMENTS 6,664,757 B1 12/2003 Gauthier et al.
6,701,880 B1 * 3/2004 Gauthier .................. B60K 6/48
123/179.5
(Continued)

FOREIGN PATENT DOCUMENTS

DE 102004008817 A1 10/2004
DE 202010000551 U1 3/2010
(Continued)

OTHER PUBLICATIONS

PCT/EP2020/067440 International Search Report (dated Sep. 7, 2020).
DE102019209476.7. Office Action (dated Jul. 16, 2020).

*Primary Examiner* — Jared Fureman
*Assistant Examiner* — Esayas G Yeshaw
(74) *Attorney, Agent, or Firm* — Peter Zura; LOZA & LOZA, LLP

(57) ABSTRACT

Technologies and techniques for charging a high-voltage battery of an electric drive of a vehicle, in which electrical power is transmitted from a low-voltage on-board electrical system of the vehicle to the high-voltage battery, and, to aid starting of the vehicle, electrical power is transmitted from a separate external unit to the low-voltage on-board electrical system of the vehicle and is transmitted from the low-voltage on-board electrical system to the high-voltage (Continued)

battery. The present disclosure also relates to a related power transmission system.

17 Claims, 1 Drawing Sheet

(51) Int. Cl.
*H02J 1/08* (2006.01)
*H02J 7/00* (2006.01)
*H02J 7/34* (2006.01)

(52) U.S. Cl.
CPC ....... *B60L 2210/10* (2013.01); *H02J 2207/20* (2020.01); *H02J 2310/48* (2020.01)

(56) References Cited

U.S. PATENT DOCUMENTS

| | | | |
|---|---|---|---|
| 11,108,248 B2 * | 8/2021 | Matsunaga | B60L 58/22 |
| 2015/0019055 A1 * | 1/2015 | Nie | B60R 16/03 |
| | | | 701/22 |
| 2018/0358839 A1 * | 12/2018 | Perez | H02J 3/46 |
| 2019/0168632 A1 * | 6/2019 | Deng | B60L 50/64 |

FOREIGN PATENT DOCUMENTS

| | | |
|---|---|---|
| DE | 102009029417 A1 | 3/2011 |
| DE | 102011011800 A1 | 8/2012 |
| DE | 102014212956 A1 | 1/2015 |
| DE | 102017209468 A1 | 12/2018 |
| JP | 2004023851 A | 1/2004 |

* cited by examiner

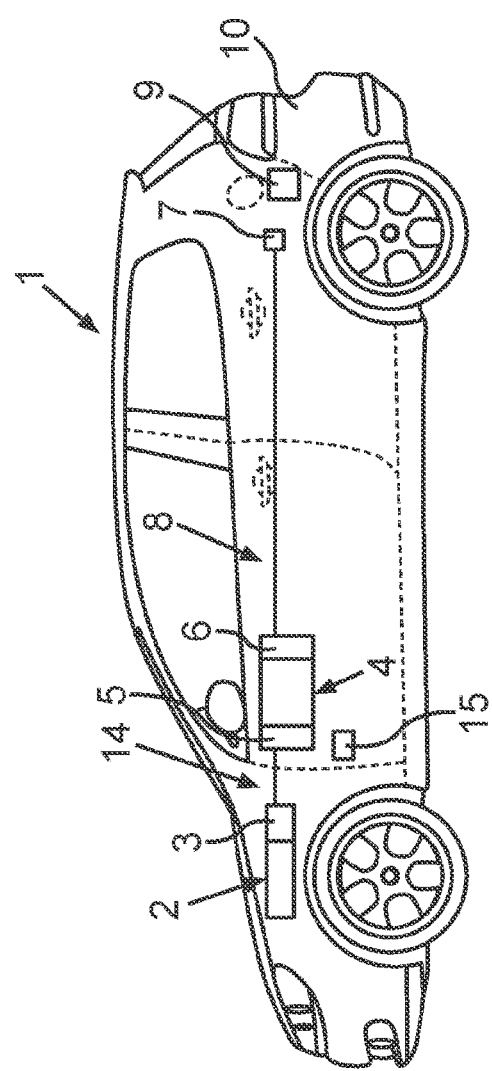
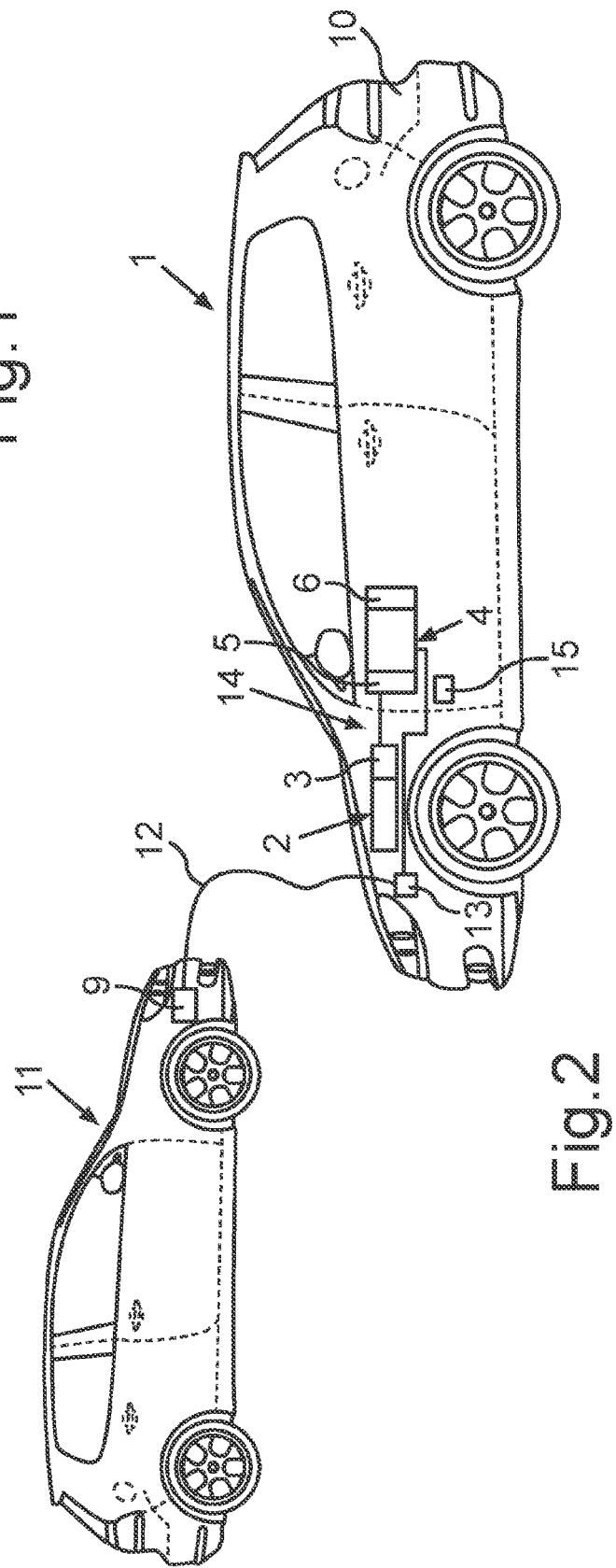

METHOD FOR CHARGING A HIGH-VOLTAGE BATTERY OF AN ELECTRIC DRIVE OF A VEHICLE, AND POWER TRANSMISSION SYSTEM FOR A VEHICLE

RELATED APPLICATIONS

The present application claims priority to International Patent App. No. PCT/EP2020/067440 to Birgel et al., filed Jun. 23, 2020, which further claims priority to German Pat. App. No. 10 2019 209 476.7 filed Jun. 28, 2019, the contents of each being incorporated by reference in their entirety herein.

TECHNICAL FIELD

Aspects of the present disclosure relate to a technologies and techniques for charging a high-voltage battery of an electric drive of a vehicle. Electrical power may be transmitted from the low-voltage electrical system of the vehicle to the high-voltage battery. Another aspect of the present disclosure relates to a power supply system for a vehicle.

BACKGROUND

DE 10 2014 208 191 A1 discloses a storage device for storing electrical power for supplying an electric motor of an electrically powerable vehicle. This external unit can be connected to the vehicle in order to supply a main storage device, for example, a traction battery, which is provided for supplying the electric motor of the electrically powerable vehicle, with electrical power.

U.S. Pat. No. 6,701,880 B1 discloses a method by means of which the high-voltage battery of a vehicle can be supplied with electrical power from a low-voltage battery of the vehicle.

Vehicles powered by an electric drive, which can be purely electric vehicles or hybrid vehicles, have a limited range, which can be reduced faster due to climatic changes, increased consumption due to convenience functions or sportier driving style. When the electrical power of the high-voltage on-board electrical system, which also includes the high-voltage battery of the vehicle, is exhausted, there is no possibility of quick aid to remedy the situation, as is the case with vehicles having internal combustion engines, for example, by means of fuel from a spare canister. In the case of a vehicle with an electric drive, charging can only take place from an electric socket, which is usually not available directly at the place where the range has dropped to 0 when such a breakdown has occurred. On the other hand, the vehicle can be switched to a recuperation mode and towed. However, such a tow may, possibly, not be permitted by the vehicle manufacturer in efforts to be able to avoid corresponding damage to the vehicle.

BRIEF SUMMARY

Aspects of the present disclosure are directed to providing a method and a power supply system that will enable the continued operation of the vehicle with the electric drive be more easily, even in such breakdown situations.

Various aspects directed to methods and power transmission systems are described in the subject matter of the claims, found below.

In some examples, a method is disclosed for charging a high-voltage battery of an electric drive of a vehicle, in which electrical power is transmitted from a low-voltage on-board electrical system of the vehicle to the high-voltage battery. As a starting aid to the vehicle that is in a breakdown situation of the vehicle, electrical power is transmitted from an external unit to the low-voltage electrical system of the vehicle and from the low-voltage on-board electrical system of the vehicle to the high-voltage battery. In doing so, it is now readily possible to supply a quasi-starting aid and therefore quasi-external starting of the vehicle that is subject to the breakdown situation. It is provided that there is no direct external transmission of power to the high-voltage on-board electrical system, and thus to the high-voltage battery. This kind of procedure is usually difficult and, due to the high voltages, can pose dangers to a user. Since the low-voltage on-board electrical system is used, in this instance, to receive externally supplied electrical power that it then transmits to the high-voltage on-board electrical system, and thus to the high-voltage battery, via this low-voltage on-board electrical system, actions and operations critical for safety are herein precluded as well. Any handling of high voltage that is externally supplied to the vehicle is therefore precluded. In addition, this configuration enables supplying electrical power from externally to the vehicle, simply and comprehensively. Since electrical power in the case of low voltage which is less than 50 V can be generated and provided by various external units, the most diverse and varied external units can be used at any time to supply electrical power to the vehicle and that is then provided internally to the high-voltage battery via the low-voltage on-board electrical system. This enables electrical power to be supplied from other vehicles at any time, especially in the case of breakdown situations, for example, because power sources that supply such voltages in the low-voltage range are present in every vehicle.

Another aspect of the present disclosure relates to a power supply system for a vehicle. Said power supply system has a high-voltage battery of the vehicle and a low-voltage electrical system of the vehicle. The power supply system further has a control unit for controlling the power supply. The power supply system is designed to carry out a method according to the aforementioned aspect or according to one advantageous embodiment thereof. In particular, this method is carried out by means of the power supply system.

Another aspect of the present disclosure also relates to a vehicle with such a power supply system.

The present disclosure also comprises the combinations of the features of the described embodiments disclosed herein.

BRIEF DESCRIPTION OF THE DRAWINGS

The present disclosure will be described in more detail hereafter based on the examples provided herein. In the drawings:

FIG. 1 shows a schematic representation of an exemplary embodiment of a power supply system, which is arranged inside a vehicle according to some aspects of the present disclosure; and FIG. 2 shows a further exemplary embodiment of a power supply system according to some aspects of the present disclosure.

DETAILED DESCRIPTION

In some examples described herein, a low-voltage on-board electrical system may be connected via a jump-start cable to a power source of another vehicle designed as an external unit, and electrical power is transmitted from this power source to the low-voltage on-board electrical system for transmission to the high-voltage battery. This means, accordingly, that another third-party vehicle can quasi serve as an electrical donor source, and the low voltage provided thereby can be easily and safely transmitted to the low-voltage electrical system of the vehicle that is to be charged via the jump-start cable.

In some examples, a low-voltage on-board electrical system may be connected to a low-voltage interface of the vehicle and that a spare battery, which is arranged inside the vehicle and designed as an external unit, may be connected to the low-voltage interface as a starting aid of the vehicle. Electrical power is thereby transmitted from the spare battery to the low-voltage electrical system of the vehicle for transmission to the high-voltage battery. For such a configuration, it can be provided that this spare battery is arranged, for example, inside the trunk of the vehicle and that it is actively connected to the low-voltage interface if it is used. Said spare battery is therefore not used especially in the conventional operation of the vehicle. In fact, it has the quasi function of a reserve canister, such as those that can be used in vehicles with internal combustion engines. In particular, when the vehicle is operated as intended, said spare battery is not part of the low-voltage on-board electrical system nor of the high-voltage on-board electrical system of the vehicle. Seen in isolation, it is therefore an external and separate entity. In particular, it is used only when it is to provide electrical power in the form of low voltage in the event of such a breakdown situation of the vehicle, and when it is to transmit the same to the low-voltage on-board electrical system via the low-voltage interface. In particular, the low-voltage on-board electrical system has its own low-voltage on-board electrical system battery, which is therefore an intended component of this low-voltage on-board electrical system and which is quasi permanently resides in the low-voltage on-board electrical system and is electrically connected to the other electrical components of this on-board electrical system.

In some examples, it is provided that the low-voltage on-board electrical system is only used as a transmission system, at least for periods of time, when power is transmitted from the external unit to the high-voltage battery. In particular, it is thus provided, in this context, that said low-voltage on-board electrical system itself is not charged by this external supply of power and therefore only serves as a quasi-transit system for this externally supplied electrical power in the low-voltage range. In such a configuration, this low-voltage on-board electrical system is provided quasi as a voltage coupling system, which receives low voltage externally and then transmits the same inside the vehicle itself directly to the high-voltage on-board electrical system, in particular the high-voltage battery.

In some examples, it can be provided that the low-voltage on-board electrical system itself is charged, at least for periods of time, during the transmission of power from the external unit to the high-voltage battery. In particular, it can be provided, in this context, that a low-voltage on-board electrical system battery of the low-voltage on-board electrical system is charged, wherein electrical power is transmitted from the charged low-voltage on-board electrical system, in particular the charged low-voltage battery, to the high-voltage battery when the starting aid is activated. In such a configuration, the low-voltage on-board electrical system serves as a power store, at least for periods of time, for the externally supplied electrical power.

In some examples, it is provided that the low-voltage on-board electrical system has a voltage converter with which the electrical power supplied by the external unit is converted, or the voltage thereof is transformed in order to be able to supply it to the high-voltage battery. In particular, the externally supplied low voltage is thus converted into a higher voltage that can be supplied to the high-voltage battery.

In particular, the low-voltage on-board electrical system is designed to provide a voltage of less than 100 V, in particular a voltage of 12 V or 34 V or 48 V. In particular, these voltages can then be provided for components of the low-voltage on-board electrical system so that they can be supplied with the corresponding low voltage. The voltage converter is designed to convert the electrical voltage into values greater than 100 V, in particular greater than 300 V.

In some examples, it is provided that in the case of a defective high-voltage battery or in the event of the high-voltage battery being switched off due to an error when the high-voltage battery cannot be charged, an emergency drive mode of the vehicle is carried out using the low-voltage on-board electrical system. In an embodiment that is very advantageous in this regard, it is therefore also possible, when the high-voltage battery can no longer be charged or can no longer be charged sufficiently, to carry out an emergency drive mode that is then required, wherein this emergency drive mode is being carried out by means of the low-voltage on-board electrical system and without involvement of the high-voltage on-board electrical system. Correspondingly, only the low-voltage on-board electrical system, and in particular only this low-voltage on-board electrical system, then provides electrical power in order to enable the relevant emergency drive mode.

It is preferably provided that the possible driven route in this emergency drive mode, in which electrical power is only provided by the low-voltage on-board electrical system and no longer by the high-voltage on-board electrical system, is limited to less than or equal to 5 km, and/or that the speed of the vehicle is limited during this operation with the low-voltage electrical system to less than or equal to 50 km/h.

In some examples, certain methods provide that a low-voltage emergency charging interface is quasi-used for connecting an external unit. For example, this unit can be arranged inside the trunk of the vehicle. This allows, in an emergency operation, when a breakdown situation has occurred due to a discharged high-voltage battery, that starting aid can be provided by any conventional vehicle used as an external unit with an external low-voltage power source. Alternatively, a fully charged spare battery can also be positioned in the vehicle itself, for example, stowed inside the trunk, and the vehicle can then be recharged with this spare battery in the breakdown situation.

Such a process can therefore be used when the high-voltage battery is empty. In this case, the high-voltage battery can be charged via this low-voltage on-board electrical system by means of the corresponding external unit, which is a unit for providing low voltage. In particular, a DC/DC converter is the voltage converter of the low-voltage on-board electrical system. In another case, when the high-voltage battery is defective, the external unit can also be utilized to provide low voltage, whereby this external electrical power is then made available to the low-voltage electrical system of the vehicle, and whereby, only on the basis of this electrical power of the low-voltage on-board electrical system, a supply of electrical power to the necessary components for them to carry out the emergency drive mode of the vehicle takes place. In another case, for example, the high-voltage battery fuse can trip. In this case too, for example, charging can take place via the spare battery or an electrical power source from a third-party vehicle, and thus electrical power can also be supplied to the low-voltage on-board electrical system of the vehicle, for example. In this case too, the emergency drive mode can take place only on the basis of the low-voltage electrical system of the vehicle, for example. Corresponding action can also be taken when, for example, while driving the vehicle, an error causes the high-voltage electrical system to be switched off. For example, this can be the case due to the tripping of the fuse of the high-voltage on-board electrical system, which has already been explained above, or due to an error within the high-voltage battery. The low-voltage on-board electrical system can be utilized immediately for emergency drive mode especially when this error that led to the switching off action does not occur in the drive train of the vehicle. Here, for example, simple evasive maneuvers, such as driving onto a shoulder or the like, can also be carried out.

In particular, certain processes also enables the externally supplied electrical power, which is a low voltage, to be routed via the low-voltage on-board electrical system for the traction of the vehicle.

In particular, a method for operating a vehicle with an electric drive is provided. In some examples, a high-voltage battery is charged according to the techniques disclosed herein. If this is not possible, an emergency operation with an electrical power supply for the components of the vehicle is carried out only by means of the low-voltage on-board electrical system. The low-voltage on-board electrical system can be supplied with electrical power from an external unit, in particular in order to then provide the power after starting aid was given.

The exemplary embodiment explained herein is a preferred embodiment of the present disclosure. In the exemplary embodiment, the described components of the embodiment each represent individual features of the present disclosure that are to be considered independently of one another, which also improve the present disclosure independently of one another and are therefore also to be regarded as part of the present disclosure individually or in combinations other than the one shown. Furthermore, the described embodiment can be supplemented by means of further features of the present disclosure that have already been described.

In the figures, functionally identical elements are each given the same reference numerals.

FIG. 1 shows a vehicle in a schematic representation. In this example, the vehicle 1 is configured as a motor vehicle, in particular a passenger car. In the exemplary embodiment, the vehicle 1 is designed as an electric vehicle. This means that said vehicle has an electric drive 14 to be able to move the vehicle 1. In this context, the vehicle 1 has a high-voltage on-board electrical system 2. The high-voltage on-board electrical system 2 has a high-voltage battery 3. In addition, the vehicle 1 has a low-voltage electrical system 4. This low-voltage on-board electrical system 4 has a voltage converter 5. The low-voltage on-board electrical system 4 is electrically coupled to the high-voltage on-board electrical system 2. The low-voltage on-board electrical system 4 also has a low-voltage on-board electrical system battery 6. Said battery is therefore intended to be part of the low-voltage on-board electrical system 4. In addition, the vehicle 1 has a low-voltage interface 7. The components mentioned in this regard are components of a power supply system 8 for the vehicle 1. Electrical power can be provided and transmitted within the power supply system 8. In the exemplary embodiment according to FIG. 1, an external unit 9 is also provided. Said unit is, in particular, also a component of the power supply system 8. In the exemplary embodiment according to FIG. 1, the external unit 9 is a spare battery. This spare battery is designed as a portable spare battery and can be arranged, for example, in a non-destructively detachable manner inside a trunk 10 of the vehicle 1. During normal operation of the vehicle 1, said external unit 9 that is designed as a spare battery is, in particular, not electrically connected to the low-voltage on-board electrical system 4, nor to the high-voltage battery 2. In this regard, it is therefore not intended to provide electrical power during the normal operation of the vehicle 8 and to feed said energy into the low-voltage on-board electrical system 4 or the high-voltage on-board electrical system 2.

If the power state of the high-voltage on-board electrical system 2 is too low for the vehicle 1 to be able to drive any longer, and it has broken down accordingly in said context, a breakdown situation of the vehicle 1 has occurred. In such an emergency situation, this spare battery, which is the external unit 9, can be electrically connected to the low-voltage interface 7. Electrical power in the low-voltage range is then transmitted to the low-voltage on-board electrical system 4 via this external unit 9. Therein, it is converted via the voltage converter 5 so that it can be transmitted as high voltage to the high-voltage battery 2, and thus to the high-voltage battery 3. In this context, it can be provided that the low-voltage on-board electrical system 4 merely serves as a transmission system for the electrical power from the external unit 9 to the high-voltage on-board electrical system 2. However, it can also be provided, at least for periods of time, that the electrical power, as it is supplied by the external unit 9, is stored in the low-voltage on-board electrical system battery 6, or said energy is used to charge this low-voltage on-board electrical system battery 6. The power, then stored in this way, can in turn be transmitted to the high-voltage on-board electrical system 2 and thus to the high-voltage battery 3 according to the previously described scenario. As a result, the high-voltage on-board electrical system 2 can be charged by means of external low-voltage power. Even with an electric vehicle, an external starting aid means can be provided quasi at any time in that electrical power is supplied in the low-voltage range.

FIG. 2 shows a further exemplary embodiment. It is provided herein that the external unit 9 is a low-voltage power source of another vehicle 11. It can be envisioned herein that this external unit 9 inside the vehicle 11 can be electrically connected to a low-voltage interface 13 of the vehicle 1 via a jump start cable 12. Said low-voltage interface 13 can be the low-voltage interface 7, or a different interface. In exemplary embodiments, either the low-voltage interface 7, or the low-voltage interface 13, or both low-voltage interfaces 7, 13 can be present. The scenario of how electrical power in the low-voltage range is supplied to vehicle 1 by this external unit 9, and how it is transmitted from there to the high-voltage on-board electrical system 2 via the low-voltage on-board electrical system 4 corresponds to the modality in the exemplary embodiment of FIG. 1. The explanation in this regard applies here accordingly and does not have to be repeated. The low-voltage interfaces 7, 13 can be 12 V, or 24 V, or 48 V interfaces in some examples.

In particular, it can be provided that, in the case of a defective high-voltage battery or in the event of the high-voltage battery being switched off due to an error, and when the high-voltage battery cannot be charged, an emergency drive mode of the vehicle (1) based on the low-voltage on-board electrical system is carried out. The components required in this regard are thus supplied with electrical power directly from the low-voltage on-board electrical system 4, and no longer from the high-voltage battery 2. In particular, the possible driving distance in this emergency drive mode with the low-voltage on-board electrical system 4 is limited to less than or equal to 5 km, for example, to less than or equal to 3 km, and/or the speed of the vehicle 1 in operation with this low-voltage on-board electrical system 4 is limited to less than or equal to 50 km/h, for example, to walking speed. In particular, the vehicle 1 has at least one control unit 15. With this unit, at least partial steps of the method for operating the vehicle 1 with respect to the electrical power management are implemented, in particular the method for charging the high-voltage battery 3.

LIST OF REFERENCE NUMERALS

1 vehicle
2 high-voltage electrical system
3 high-voltage battery
4 low-voltage on-board electrical system
5 voltage converter
6 low-voltage on-board electrical system battery
7 low voltage interface
8 power supply system
9 external unit
10 trunk
11 another vehicle
12 jump-start cable
13 low voltage interface
14 electric drive
15 control unit

The invention claimed is:

1. A method for charging an electric drive of a vehicle, comprising:
    activating an emergency drive mode condition of the vehicle via a low-voltage on-board electrical system, if (i) a defective high-voltage battery, or (ii) a switched-off high-voltage battery, is detected;
    transmitting electrical power from the low-voltage on-board electrical system of the vehicle to a high-voltage battery under the emergency drive mode condition;
    receiving further electrical power from a separate external unit via a low-voltage interface to the low-voltage on-board electrical system of the vehicle during the emergency drive mode condition; and
    transmitting the further electrical power from the low-voltage on-board electrical system to the high-voltage battery to facilitate start-up of the vehicle.

2. The method according to claim 1, wherein transmitting further electrical power from the separate external unit comprises transmitting the further electrical power via a jump-start cable of a power source of another vehicle configured as the external unit.

3. The method according to claim 1, wherein the separate external unit is configured as a spare battery arranged inside the vehicle and further comprising transmitting the further electrical power by transmitting the further electrical power from the spare battery to the low-voltage on-board electrical system of the vehicle for transmission to the high-voltage battery.

4. The method according to claim 1, wherein, during the transmitting of further electrical power from the external unit, the low-voltage on-board electrical system is utilized at least for periods of time only as a transmission system during the emergency drive mode condition, and a low-voltage on-board electrical system battery is not charged.

5. The method according to claim 1, wherein during the transmitting of the further electrical power from the external unit, the low-voltage on-board electrical system is charged at least for periods of time, such that a low-voltage on-board electrical system battery of the low-voltage on-board electrical system is charged, and wherein the further electrical power is then transmitted from the charged low-voltage on-board electrical system to the high-voltage battery to facilitate start-up of the vehicle.

6. The method according to claim 1, wherein the low-voltage on-board electrical system comprises a voltage converter for converting the further electrical power supplied by the external unit to the high-voltage battery.

7. The method according to claim 6, wherein the low-voltage on-board electrical system is configured to provide a voltage of less than 100 V for components of the low-voltage on-board electrical system, and in the voltage converter is configured to convert the electrical voltage into values greater than 100 V.

8. The method according to claim 1, further comprising limiting the operation of the vehicle during an emergency drive mode via the low-voltage on-board electrical system, wherein the limiting of the operation comprises one of limiting the travel distance to less than or equal to 5 km or limiting the speed of the vehicle to less than or equal to 50 km/h.

9. A power supply system for a vehicle, comprising:
    a high-voltage battery;
    a low-voltage on-board electrical system; and
    a control unit, wherein the control unit is configured to
        activate an emergency drive mode condition of the vehicle via the low-voltage on-board electrical system, if (i) a defective high-voltage battery, or (ii) a switched-off high-voltage battery is detected,
        receive electrical power from a separate external unit via a low-voltage interface to the low-voltage on-board electrical system of the vehicle during the emergency drive mode condition,
        and
        transmit the further electrical power from the low-voltage on-board electrical system to the high-voltage battery to facilitate start-up of the vehicle.

10. The power supply system according to claim 9, wherein the control unit is configured to transmit the further electrical power from the separate external unit by transmitting the further electrical power via a jump-start cable of a power source of another vehicle configured as the external unit.

11. The power supply system according to claim 9, wherein the separate external unit is configured as a spare battery arranged inside the vehicle and further is configured to transmit the further electrical power by transmitting the further electrical power from the spare battery to the low-voltage on-board electrical system of the vehicle for transmission to the high-voltage battery.

12. The power supply system according to claim 9, wherein, during the transmitting of further electrical power from the external unit, the low-voltage on-board electrical system is utilized at least for periods of time only as a transmission system during the emergency drive mode condition, and a low-voltage on-board electrical system battery is not charged.

13. The power supply system according to claim 9, wherein during the transmitting of the further electrical power from the external unit, the low-voltage on-board electrical system is charged at least for periods of time, such that a low-voltage on-board electrical system battery of the low-voltage on-board electrical system is charged, and wherein the further electrical power is then transmitted from the charged low-voltage on-board electrical system to the high-voltage battery to facilitate start-up of the vehicle.

14. The power supply system according to claim 9, wherein the low-voltage on-board electrical system comprises a voltage converter for converting the further electrical power supplied by the external unit to the high-voltage battery.

15. The power supply system according to claim 14, wherein the low-voltage on-board electrical system is configured to provide a voltage of less than 100 V for components of the low-voltage on-board electrical system, and in the voltage converter is configured to convert the electrical voltage into values greater than 100 V.

16. The power supply system according to claim 9, wherein the control unit is configured to limit the operation of the vehicle during an emergency drive mode via the low-voltage on-board electrical system, wherein the limiting of the operation comprises one of limiting the travel distance to less than or equal to 5 km or limiting the speed of the vehicle to less than or equal to 50 km/h.

17. A power supply system for a vehicle, comprising:
a high-voltage battery;
a low-voltage on-board electrical system; and
a control unit, wherein the control unit is configured to
activate an emergency drive mode condition of the vehicle via the low-voltage on-board electrical system, if a low-charge condition of the high-voltage battery is detected,
receive electrical power from a separate external unit via a low-voltage interface to the low-voltage on-board electrical system of the vehicle,
transmit the further electrical power from the low-voltage on-board electrical system to the high-voltage battery to facilitate start-up of the vehicle.

* * * * *